(12) United States Patent
Schmidt et al.

(10) Patent No.: US 11,181,931 B2
(45) Date of Patent: Nov. 23, 2021

(54) METHOD FOR OPERATING A SYSTEM HAVING VISIBLE LIGHT SOURCES AND SENSORS FOR BIDIRECTIONAL COMMUNICATION AND SYSTEM HAVING VISIBLE LIGHT SOURCES AND SENSORS FOR BIDIRECTIONAL COMMUNICATION

(71) Applicant: SEW-EURODRIVE GMBH & CO. KG, Bruchsal (DE)

(72) Inventors: Josef Schmidt, Graben-Neudorf (DE); Zhidong Hua, Bruchsal (DE); Thomas Schäfer, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 376 days.

(21) Appl. No.: 15/781,750

(22) PCT Filed: Nov. 30, 2016

(86) PCT No.: PCT/EP2016/025157
§ 371 (c)(1),
(2) Date: Jun. 6, 2018

(87) PCT Pub. No.: WO2017/097431
PCT Pub. Date: Jun. 15, 2017

(65) Prior Publication Data
US 2018/0356838 A1    Dec. 13, 2018

(30) Foreign Application Priority Data
Dec. 8, 2015 (DE) ...................... 10 2015 015 770.1

(51) Int. Cl.
*G05D 1/02* (2020.01)
*G08C 23/04* (2006.01)
(Continued)

(52) U.S. Cl.
CPC ............ *G05D 1/0297* (2013.01); *G01S 5/009* (2013.01); *G01S 5/0036* (2013.01);
(Continued)

(58) Field of Classification Search
CPC ......... G05D 1/0297; G05D 2201/0216; G05D 1/0223; G05D 1/0276; G05D 1/0293;
(Continued)

(56) References Cited

U.S. PATENT DOCUMENTS 5,289,183 A * 2/1994 Hassett ................. G01S 13/765
340/905
5,428,544 A 6/1995 Shyu
(Continued)

FOREIGN PATENT DOCUMENTS

CN    102224751 A    10/2011
CN    102486648 A    6/2012
(Continued)

OTHER PUBLICATIONS

R. Colin Johnson; Visible light illuminates a new approach for wireless comms; May 24, 2010; Electronic Engineering Times; pp. 18-22 (Year: 2010).*
(Continued)

*Primary Examiner* — Michael C Zarroli
(74) *Attorney, Agent, or Firm* — Carter, DeLuca & Farrell LLP

(57) ABSTRACT

A system includes vehicles, a central control unit, and a stationary transceiver module connected to the central control unit via a bidirectional communications channel. Each vehicle has a transceiver module for bidirectional communication with the stationary transceiver module and/or a vehicle. The transceiver module has a controllable light source and a light sensor. The central control unit transmits driving orders to the vehicles via the stationary transceiver
(Continued)

module. A first vehicle that is located within a spatial transmission area of the stationary transceiver module forwards a driving order to a second vehicle that is located outside the spatial transmission area of the stationary transceiver module, and the second vehicle transmits data via the first vehicle and the stationary transceiver module to the central control unit.

21 Claims, 1 Drawing Sheet

(51) Int. Cl.
*H04Q 9/00* (2006.01)
*G01S 5/00* (2006.01)
*G07C 5/00* (2006.01)
*G08G 1/00* (2006.01)
*H04W 4/46* (2018.01)
*H04W 4/44* (2018.01)
*H04B 10/116* (2013.01)
*H04W 88/04* (2009.01)

(52) U.S. Cl.
CPC ......... *G05D 1/0223* (2013.01); *G05D 1/0276* (2013.01); *G05D 1/0293* (2013.01); *G07C 5/008* (2013.01); *G08C 23/04* (2013.01); *G08G 1/22* (2013.01); *H04B 10/116* (2013.01); *H04Q 9/00* (2013.01); *H04W 4/44* (2018.02); *H04W 4/46* (2018.02); *H04W 88/04* (2013.01); *G05D 2201/0216* (2013.01)

(58) Field of Classification Search
CPC ............ H04Q 9/00; H04W 4/46; H04W 4/44; H04W 88/04; G01S 5/0036; G01S 5/009; G07C 5/008; G08G 1/22; H04B 10/116; G08C 23/04
See application file for complete search history.

(56) References Cited

U.S. PATENT DOCUMENTS

| | | | |
|---|---|---|---|
| 6,615,137 B2 * | 9/2003 | Lutter | G08G 1/0965 340/436 |
| 7,706,963 B2 * | 4/2010 | Parikh | G08G 1/127 340/901 |
| 8,688,376 B2 * | 4/2014 | Stahlin | H04W 4/90 701/517 |
| 9,305,407 B1 * | 4/2016 | Walton | G07C 5/008 |
| 10,114,380 B2 | 10/2018 | Hua et al. | |
| 2002/0034950 A1 * | 3/2002 | Sawada | H04W 16/32 455/446 |
| 2005/0129410 A1 * | 6/2005 | Wilsey | H04B 10/1143 398/153 |
| 2006/0079997 A1 | 4/2006 | McLurkin | |
| 2010/0291874 A1 * | 11/2010 | Himmelstein | G06Q 10/10 455/41.2 |
| 2011/0105134 A1 * | 5/2011 | Kim | H04W 72/048 455/450 |
| 2012/0251123 A1 | 10/2012 | Pederson | |
| 2013/0282168 A1 * | 10/2013 | Yokota | B62D 65/18 700/230 |
| 2015/0088373 A1 | 3/2015 | Wilkins | |
| 2015/0358080 A1 | 12/2015 | Hua | |

FOREIGN PATENT DOCUMENTS

| | | |
|---|---|---|
| CN | 103492969 A | 1/2014 |
| DE | 102009043060 A1 | 3/2011 |
| DE | 102013001358 B4 | 7/2014 |
| EP | 2093026 A1 | 8/2009 |
| WO | 2015055279 A1 | 4/2015 |

OTHER PUBLICATIONS

Zhu et al; Handover method in visible light communications between the moving vehicle and multiple LED streetlights; 2014; Optik; 3540-3544 (Year: 2014).*

International Search Report dated Mar. 7, 2017, in International Application No. PCT/EP2016/025157 (English-language translation).

International Preliminary Report on Patentability issued in International Patent Application No. PCT/EP2016/025157, dated Jun. 12, 2018 (9 pages total).

European Office Action issued from the European Patent Office to counterpart Application No. 16 810 253.1 dated May 25, 2020, 8 pages.

* cited by examiner

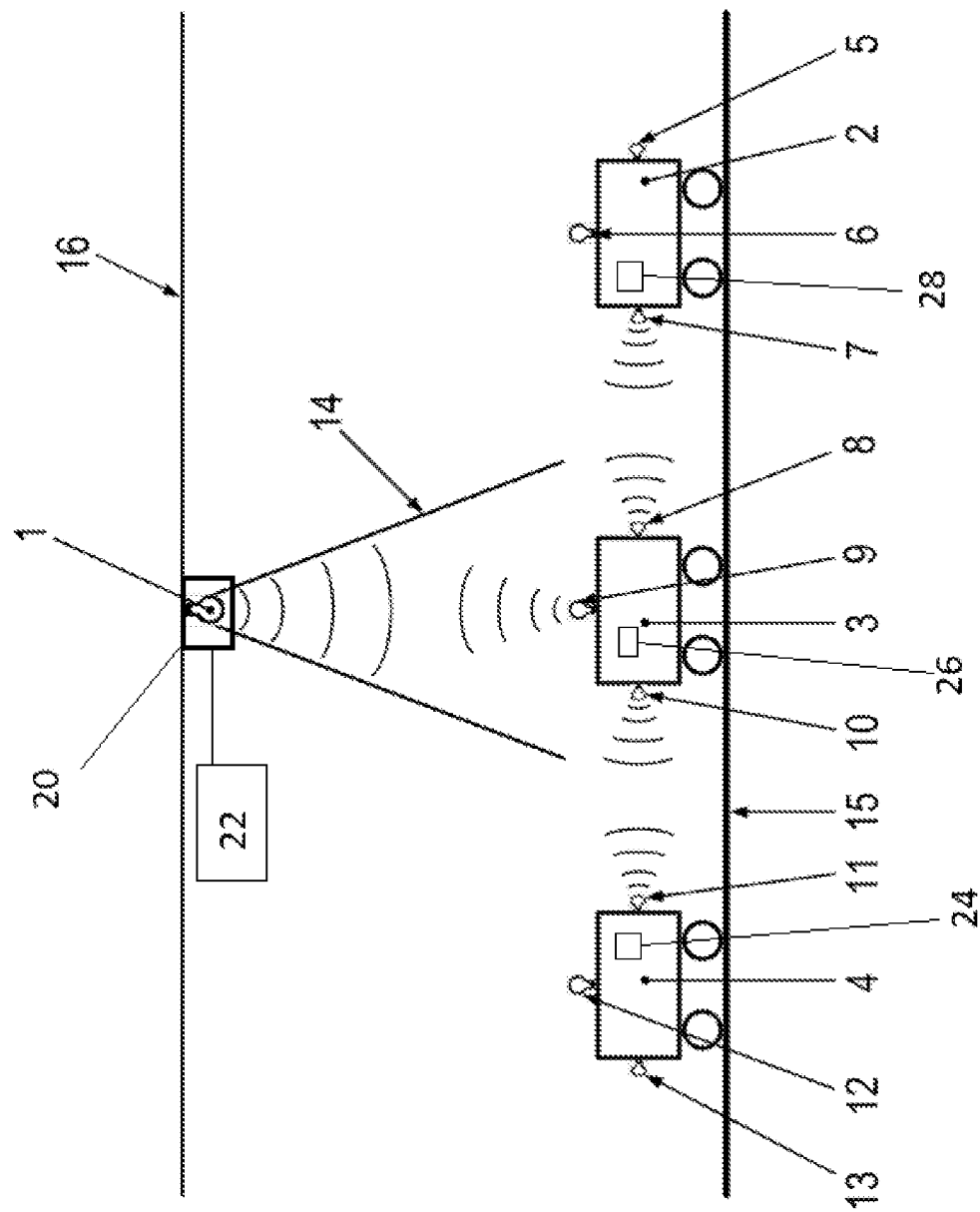

METHOD FOR OPERATING A SYSTEM HAVING VISIBLE LIGHT SOURCES AND SENSORS FOR BIDIRECTIONAL COMMUNICATION AND SYSTEM HAVING VISIBLE LIGHT SOURCES AND SENSORS FOR BIDIRECTIONAL COMMUNICATION

FIELD OF THE INVENTION

The present invention relates to a method for operating a system, and to a system.

BACKGROUND INFORMATION

A system for a plant and a method for operating such a system is described in German Published Patent Application No. 10 2013 001 358.

German Published Patent Application No. 10 2009 043 060 shows a system of mobile robots having a base station.

SUMMARY

Example embodiments of the present invention provide a method for operating a system as well as a system, and improving the safety in the process.

According to an example embodiment of the present invention, in a method for operating, especially for controlling, a system that includes vehicles, a central control unit, and at least one transceiver module, which is stationary, is connected to the central control unit by a bidirectional communications channel, and has a spatial transmission area, in particular a transmission cone, each vehicle has a transceiver module, each particularly having a spatial transmission area for the bidirectional communication with the stationary transceiver module and/or a vehicle, the respective transceiver module has at least one controllable light source and a light sensor, in particular a light source of visible light and a light sensor for visible light, the central control unit transmits driving orders to the vehicles with the aid of the stationary transceiver module, a first vehicle located in the spatial transmission area of the stationary transceiver module forwards a driving order to a second vehicle that is located outside the spatial transmission area of the stationary transceiver module, the second vehicle transmitting data, in particular status information, to the central control unit with the aid of the first vehicle and the stationary transceiver module.

This has the advantage that light sources provided for illumination purposes are able to be used for the data transmission. With the aid of the vehicles, the number of stationary light sources is able to be reduced at a high transmission range.

Obstacles for the transmitted light of the stationary transceiver module are able to be circumvented by the vehicles.

Visible light can easily be generated by simple, cost-effective light sources, in particular LEDs, and easily be detected using simple, cost-effective sensors, in particular photodiodes or phototransistors.

Each vehicle may have a position-determination device, in particular including an odometric sensor and/or a GPS sensor, and transmits its position data, determined by the position-determination device, with the aid of the stationary transceiver module and/or the first vehicle to a central control unit. This has the advantage that the position of each vehicle is able to be determined independently of the central control unit. In an advantageous manner, this makes it possible to determine the position of a vehicle outside the spatial transmission areas of the stationary transceiver module and the transceiver modules of the other vehicles. This increases the range of the system.

Each vehicle may determine the position data of vehicles that are located in its spatial transmission area relative to itself and transmits these determined relative position data with the aid of the stationary transceiver module to the central control unit. This offers the advantage that the collision risk among the vehicles is able to be reduced. When preparing the driving orders, the central control unit takes the relative positions of the vehicles into account and calculates the driving routes such that the vehicles will not collide. This improves the safety.

The central control unit may use the position data of each vehicle, the relative position data of the vehicles, and the position of the stationary transceiver module in order to determine position corrections and transmits them to the vehicles. This is considered advantageous inasmuch as it improves the precision of the respective position, determined with the aid of the position-determination device, because the position corrections may be utilized for determining reference positions.

The driving order for a respective vehicle may include
a destination and/or
a starting point and/or
a driving route and/or
a velocity and/or
a release for a route section of the driving route and/or
a maximum driving time.

This has the advantage that the driving order for a respective vehicle is precisely specified by the central control unit. The setpoint position of the vehicle may be predefined for each instant. This makes it possible to easily locate the vehicle in the event of a fault.

A vehicle that is located outside the spatial transmission area of all other vehicles and of the stationary transceiver module at the destination point of its driving order automatically may return to the starting point of its driving order. This has the advantage of enlarging the range of the system without increasing the number of vehicles or the number of the stationary transceiver modules. It is thereby possible that a vehicle leaves a building that houses the system and automatically returns after carrying out its driving order. The vehicle requires no additional driving order for its return. The vehicle may drive in the reverse direction of its previous driving order.

The actual position of the vehicle, instantaneously determined with the aid of the position-determination device, may be controlled to a setpoint position that is current according to the driving route. This has the advantage that the vehicle requires no additional driving order for its return. The vehicle may drive in the opposite direction of its previous driving order.

As soon as a vehicle remains outside the spatial transmission areas of all other vehicles and of the stationary transceiver module for longer than the predefined maximum driving time of its driving order, the central control unit may transmit a driving order, which includes a driving route that is identical to the driving order of the vehicle, to a further vehicle. After establishing a communications link to the vehicle, the further vehicle receives the status information of the vehicle, stores it, drives back to the starting point of the driving order of the further vehicle and transmits the status information of the vehicle to the central control unit. This has the advantage that vehicles are able to be located in the event of a fault. The status information may be analyzed by the central control unit, and the vehicle may be recoverable by other vehicles and/or may be assigned a new driving order. The safety is therefore improved.

The second vehicle may receive a driving order from the first vehicle and forwards this driving order to another vehicle. This offers the advantage that driving orders are able to be forwarded via multiple vehicles. The driving orders of all vehicles may be stored in each vehicle so that each vehicle is locatable by each other vehicle on the basis of its driving order.

The second vehicle may store a driving order and may forward it with a time delay, which has the advantage of improving the range of the system.

The second vehicle may receive a first and a second driving order, and the second vehicle may carry out the first driving order and may store the second driving order. After establishing a communications link to the further vehicle, the second vehicle transmits the second driving order to the further vehicle. This has the advantage that the second vehicle is able to be dispatched to the further vehicle with the aid of the first driving order so that the second driving order is able to be forwarded to the further vehicle.

According to an example embodiment of the present invention, in the system, in particular for executing a method as described herein, the system includes vehicles and at least one transceiver module, which is disposed in a stationary manner and has a spatial transmission area, in particular a transmission cone, each vehicle has a respective first transceiver module, a respective second transceiver module, and a respective position-determination device, in particular including an odometric sensor and/or a GPS sensor, and/or a respective distance sensor, in particular a radar sensor and/or an ultrasonic sensor. The respective transceiver module has at least one controllable light source and a light sensor, in particular a light source of visible light and a light sensor for visible light. Each vehicle is arranged for the bidirectional communication with the stationary transceiver module using the respective first transceiver module, and using the respective second transceiver module, is arranged for the bidirectional communication with the respective other vehicles with the aid of their respective second receiver modules. This has the advantage that light sources that are provided for an illumination may be used for the transmission of data. The number of stationary light sources is able to be reduced by the vehicles at a high transmission range.

Obstacles for the transmitted light of the stationary transceiver module are able to be circumvented by the vehicles.

Visible light can be generated using simple, cost-effective light sources, in particular LEDs, and is able to be detected using simple, cost-effective sensors, in particular photodiodes or phototransistors.

The system may have a central control unit for the control of the vehicles; the central control unit may be connected to the stationary transceiver module with the aid of at least one bidirectional communications channel, the central control unit being designed to transmit driving orders to a respective vehicle using the stationary transceiver module. This has the advantage that it is possible to actuate all vehicles of the system using a single central control unit. The collision risk is therefore able to be reduced since all vehicles are centrally controllable and all driving orders are able to be coordinated with one another.

Each vehicle may have a memory in which position data of the stationary transceiver module and/or respective identifying information and/or position data of the respective vehicle are stored. This offers the advantage that position data are able to be transferred with the aid of the vehicle, especially able to be transferred with a time delay. These position data may be used as reference points for determining the position of the vehicles with the aid of position-determination device, which improves the accuracy of the position determination.

The memory of the respective vehicle may be arranged to store driving orders for a further vehicle. This is considered advantageous since driving orders are able to be transferred with a time delay utilizing the vehicles.

The stationary transceiver module may be disposed above the vehicles. This is considered advantageous since the data transmission may be carried out in a vertical direction where fewer obstacles for light are located.

The respective first transceiver module of a respective vehicle may be disposed on the particular vehicle in alignment with the stationary transceiver module. This offers the advantage that the data transmission may be carried out in a vertical direction where fewer obstacles for light are located.

The system may have a plurality of stationary transceiver modules, which are set apart from one another, the spatial transmission areas of the stationary transceiver modules, in particular, being set apart from one another, and each stationary transceiver module may be connected to the central control unit at least via one bidirectional communications channel. This has the advantage that the transmission of the data and/or the driving orders is able to be accelerated in that the driving routes of the vehicles to the stationary transceiver modules are able to be shortened.

The stationary transceiver modules may act as reference points for the position determination of the vehicles with the aid of the position-determination device, which therefore improves the accuracy of the position determination.

Each vehicle may have at least one third transceiver module, the third transceiver module being arranged for the communication with the respective second and/or third transceiver module(s) of the other vehicles. This offers the advantage that it allows for an enlargement of the spatial transmission area of the respective vehicle.

The spatial transmission area of the respective second transceiver module and the spatial transmission area of the respective third transceiver module may jointly cover a larger spatial area than the second or the third spatial transmission areas. This offers the advantage of allowing for an enlargement of the spatial transmission area of the vehicle.

The respective second transceiver module may be aligned in the driving direction of the respective vehicle, and the respective third transceiver module may be aligned counter to the driving direction of the respective vehicle. This has the advantage that the spatial transmission areas of the transceiver modules of a respective vehicle minimally overlap with one another so that the entire spatial transmission area of the respective vehicle is able to be maximized.

Further features and aspects of example embodiments of the present invention are described in greater detail below with reference to the appended FIGURE.

BRIEF DESCRIPTION OF THE DRAWING

FIG. 1 shows a system of vehicles according to an example embodiment of the present invention in a side view.

DETAILED DESCRIPTION

The system includes at least one stationary transceiver 20 module and vehicles that have at least two transceiver modules in each case.

The system may be disposed inside a building, in particular a warehouse or a production hall. The vehicles (2, 3, 4) drive on a driving surface 15 on the floor of the building. The stationary transceiver module is situated above the vehicles (2, 3, 4), e.g., on ceiling 16 of the building.

In a further exemplary embodiment, the system is used outdoors. The stationary transceiver module is mounted on a post, especially a lamp pole, and aligned with respect to the ground, in particular driving surface 15.

In a further exemplary embodiment, the vehicles (2, 3, 4) drive both outdoors and inside a building, and at least one stationary transceiver module is disposed in the hall, and/or at least one stationary transceiver module is situated outside.

Each transceiver module has a controllable light source (1, 5, 6, 7, 8, 9, 10, 11, 12, 13) of visible light and a light sensor for visible light. Each light source (1, 5, 6, 7, 8, 9, 10, 11, 12, 13) has a spatially restricted spatial transmission area, in particular a transmission cone 14.

As a result, the building is able to be illuminated by the stationary transceiver unit.

The stationary transceiver module 20 is connected to a central control unit 22 with the aid of a bidirectional communications channel. The central control unit 22 controls the stationary transceiver module 20, thereby actuating light source 1 of the stationary transceiver unit to emit a communications signal in the form of intensity-modulated light.

A light sensor of a transceiver module of a vehicle (2, 3, 4) detects the intensity-modulated light, and a signal electronics system of the transceiver module evaluates the received communications signal.

The central control unit uses the stationary transceiver module to transmit driving orders to the vehicles (2, 3, 4).

A driving order for a respective vehicle (2, 3, 4) includes
a destination and/or
a starting point and/or
a driving route and/or
a velocity and/or
a release for a route section of the driving route and/or
a maximum driving time.

Each vehicle (2, 3, 4) has a first transceiver module for the bidirectional communication with the stationary transceiver module. The respective first transceiver module may be disposed on the upper side of each vehicle (2, 3, 4).

Using the first transceiver module, the respective vehicle (2, 3, 4) transmits data, especially status data, to the stationary transceiver module, which forwards the data to the central control unit.

Each vehicle (2, 3, 4) has at least one second transceiver module for the bidirectional communication with another vehicle (2, 3, 4). The respective second transceiver module is situated such that it is transversely aligned with respect to a normal plane of driving surface 15. The respective second transceiver module may be disposed such that it is aligned in the driving direction of the respective vehicle (2, 3, 4).

As schematically illustrated in FIG. 1, each vehicle (2, 3, 4) may have a third transceiver module (24, 26, 28), which is disposed such that the region covered by the spatial transmission area of the second transceiver module and by the spatial transmission area of the third transceiver module (24, 26, 28) is greater than the spatial transmission area of the second transceiver module and greater than the spatial transmission area of the third transceiver module (24, 26, 28). The respective second transceiver module and the respective third transceiver (24, 26, 28) module may be situated opposite from each other. The respective third transceiver (24, 26, 28) module may be situated counter to the driving direction of the respective vehicle (2, 3, 4).

Using the second and/or the third transceiver module(s), the vehicles (2, 3, 4) exchange status data such as position data and/or error reports and/or driving orders.

An ad-hoc network is therefore created that considerably improves the range of the system.

Each vehicle (2, 3, 4) has at least one distance sensor, in particular a radar sensor and/or an ultrasonic sensor, and/or an anti-collision system.

In addition, each vehicle (2, 3, 4) has a position-determination device, in particular an odometric sensor and/or a GPS sensor.

Using the odometric sensor, the position of the respective vehicle (2, 3, 4) relative to a starting point and/or an initialization point is able to be determined independently of reference points with the aid of an angle sensor on a drive of the respective vehicle (2, 3, 4).

The GPS sensor may be used to determine the absolute position of the respective vehicle (2, 3, 4). The system may have a reference point whose precise position data are known so that a comparison of the position data of the respective vehicle (2, 3, 4) with the position data of the reference point—referred to as a differential GPS—makes it possible to determine the absolute position of the respective vehicle (2, 3, 4) with high precision even inside a building.

Each vehicle (2, 3, 4) has a memory unit. The memory unit is arranged to store driving orders and/or status data and/or identifying information.

A first vehicle 3 that is located in the spatial transmission area of the stationary transceiver module receives a driving order from the control unit and forwards this driving order to a second vehicle (2, 4) which is located outside the spatial transmission area of the stationary transceiver module.

First vehicle 3 located in the spatial transmission area of the stationary transceiver module receives status data of the second vehicle (2, 4), which is located in the spatial transmission area of the second and/or third transceiver module of first vehicle 3. First vehicle 3 forwards the status data of the second vehicle (2, 4) to the central control unit with the aid of its first transceiver module and the stationary transceiver module.

Each vehicle (2, 3, 4) ascertains the relative position data of vehicles (2, 3, 4) that are located in the respective spatial transmission area of its second and/or third transceiver module(s) relative to its own position and forwards these position data with the aid of the stationary transceiver module and/or a transceiver module of a further vehicle to the central control unit.

Using the known absolute position of the stationary transceiver module, the relative position data of the vehicles (2, 3, 4), and the position data of the vehicles (2, 3, 4) determined with the aid of the respective position-determination device, the central control unit determines position corrections for the respective vehicles (2, 3, 4) and transmits these position corrections to the vehicles (2, 3, 4). The individual vehicle uses these position corrections to correct the position data determined with the aid of the position-determination device.

A vehicle that is located outside the spatial transmission areas of all other vehicles and the stationary transceiver module after carrying out its driving order, i.e. is located at the destination, automatically returns to the starting point of its driving order. To do so, the vehicle determines its position with the aid of the position-determination device and controls this position to a setpoint position according to the driving order. The vehicle may drive the same travel route that was specified in its previous driving order, doing so in the reverse direction.

As an alternative, the vehicle stops as soon as it has established a communications link to another vehicle and/or to the stationary transceiver module and then waits for a new driving order.

As soon as a vehicle is located outside the spatial transmission areas of all other vehicles and the stationary transceiver module for longer than the predefined maximum driving time of its driving order, the central control unit sends a driving order, which includes a driving route that is identical to the driving order of the vehicle, to a further vehicle. The further vehicle follows this route and stops after establishing a communications link to the vehicle. The further vehicle receives and stores the status information of the vehicle and drives back to the starting point of the driving order of the further vehicle, where it transmits the status information of the vehicle to the central control unit.

A vehicle may receive a first driving order and a second driving order for a further vehicle from the stationary transceiver module, or from a first vehicle 3 that is located in the spatial transmission area of the stationary spatial transmission area of the stationary transceiver module. The vehicle executes the first driving order and stores the second driving order. As soon as the vehicle has established a communications link to the further vehicle, it forwards the second driving order to the further vehicle.

The system may have more than one stationary transceiver module, and all stationary transceiver modules are connected to a single central control unit with the aid of a communications channel, in particular a bidirectional communications channel, in each case.

The respective spatial transmission areas of the stationary transceiver modules are set apart from one another.

Each vehicle (2, 3, 4) permanently searches for other vehicles (2, 3, 4) or for stationary transceiver modules in the spatial transmission areas of its transceiver modules in order to establish a communications link. As soon as the respective vehicle (2, 3, 4) has established a communications link, it transmits its status data and receives the status data and/or driving orders of the other vehicles (2, 3, 4) or the stationary transceiver modules.

LIST OF REFERENCE NUMERALS 1 light source
2 vehicle
3 vehicle
4 vehicle
5 light source
6 light source
7 light source
8 light source
9 light source
10 light source
11 light source
12 light source
13 light source
14 transmission cone
15 driving surface
16 ceiling
20 stationary transceiver module
22 central control unit
24 third transceiver module
26 third transceiver module
28 third transceiver module.

The invention claimed is:

1. A method for operating and/or controlling a system that includes a plurality of vehicles, a central control unit, and at least one stationary transceiver module connected to the central control unit by a bidirectional communications channel, the transceiver module having a spatial transmission area and/or a transmission cone, each vehicle including a respective transceiver module and/or a respective spatial transmission area for bidirectional communication with the stationary transceiver module and/or another vehicle, the respective transceiver module having a controllable light source and a light sensor, comprising:
   transmitting, by the central control unit, driving orders to the vehicles via the stationary transceiver module;
   forwarding, by a first vehicle located in the spatial transmission area of the stationary transceiver module, a driving order to a second vehicle located outside the spatial transmission area of the stationary transceiver module; and
   transmitting, by the second vehicle, data and/or status information to the central control unit via the first vehicle and the stationary transceiver module;
   wherein the controllable light source of at least the stationary transceiver module includes a controllable light source of visible light and the light sensor of at least each vehicle includes a light sensor for visible light.

2. The method according to claim 1, wherein the controllable light source of each vehicle includes a controllable light source of visible light and/or the light sensor of the stationary transceiver module includes a light sensor for visible light.

3. The method according to claim 1, wherein each vehicle includes a position-determination device;
   the method including transmitting position data determined by the position-determination device to the central control unit via the stationary transceiver module and/or the first vehicle, each vehicle determining position data of vehicles that are located in its spatial transmission area relative to itself, and transmitting the determined relative position data via the stationary transceiver module to the central control unit, the central control unit determining position corrections based on the position data of each vehicle, relative position data of the vehicles, and a position of the stationary transceiver module and transmitting the position corrections to the vehicles.

4. The method according to claim 1, wherein the position-determination device includes an odometric sensor and/or a GPS sensor.

5. The method according to claim 1, wherein the driving order includes a destination, a starting point, a driving route, a velocity, a release for a route section of the driving route, and/or a maximum driving time.

6. A method for operating and/or controlling a system that includes a plurality of vehicles, a central control unit, and at least one stationary transceiver module connected to the central control unit by a bidirectional communications channel, the transceiver module having a spatial transmission area and/or a transmission cone, each vehicle including a respective transceiver module and/or a respective spatial transmission area for bidirectional communication with the stationary transceiver module and/or another vehicle, the respective transceiver module having a controllable light source and a light sensor, comprising:
   transmitting, by the central control unit, driving orders to the vehicles via the stationary transceiver module;

forwarding, by a first vehicle located in the spatial transmission area of the stationary transceiver module, a driving order to a second vehicle located outside the spatial transmission area of the stationary transceiver module; and transmitting, by the second vehicle, data and/or status information to the central control unit via the first vehicle and the stationary transceiver module;

wherein the controllable light source of at least the stationary transceiver module includes a controllable light source of visible light and the light sensor of at least each vehicle includes a light sensor for visible light;

the method further comprising:

automatically returning a vehicle that is located outside the spatial transmission areas of all other vehicles and the stationary transceiver module at a destination point of the driving order to a starting point of the driving order; and/or controlling an actual position of the vehicle, instantaneously determined by a position-determination device to a respective current setpoint position according to a driving route.

7. A method for operating and/or controlling a system that includes a plurality of vehicles, a central control unit, and at least one stationary transceiver module connected to the central control unit by a bidirectional communications channel, the transceiver module having a spatial transmission area and/or a transmission cone, each vehicle including a respective transceiver module and/or a respective spatial transmission area for bidirectional communication with the stationary transceiver module and/or another vehicle, the respective transceiver module having a controllable light source and a light sensor, comprising:

transmitting, by the central control unit, driving orders to the vehicles via the stationary transceiver module;

forwarding, by a first vehicle located in the spatial transmission area of the stationary transceiver module, a driving order to a second vehicle located outside the spatial transmission area of the stationary transceiver module; and transmitting, by the second vehicle, data and/or status information to the central control unit via the first vehicle and the stationary transceiver module;

wherein the controllable light source of at least the stationary transceiver module includes a controllable light source of visible light and the light sensor of at least each vehicle includes a light sensor for visible light; and wherein, as soon as one vehicle stays outside the spatial transmission areas of all other vehicles and of the stationary transceiver module for longer than a predefined maximum driving time of the driving order for the one vehicle, the central control unit transmits a driving order to a further vehicle;

the driving order of the further vehicle including a driving route that is identical to a driving order of the one vehicle;

the further vehicle, after establishing a communications link to the one vehicle, receives and stores status information of the one vehicle, drives back to a starting point of the driving order of the further vehicle, and transmits the status information of the one vehicle to the central control unit.

8. The method according to claim 1, further comprising:

receiving, by the second vehicle, a driving order from the first vehicle; and forwarding, by the second vehicle, to a further vehicle, the driving order received from the first vehicle.

9. A method for operating and/or controlling a system that includes a plurality of vehicles, a central control unit, and at least one stationary transceiver module connected to the central control unit by a bidirectional communications channel, the transceiver module having a spatial transmission area and/or a transmission cone, each vehicle including a respective transceiver module and/or a respective spatial transmission area for bidirectional communication with the stationary transceiver module and/or another vehicle, the respective transceiver module having a controllable light source and a light sensor, comprising:

transmitting, by the central control unit, driving orders to the vehicles via the stationary transceiver module;

forwarding, by a first vehicle located in the spatial transmission area of the stationary transceiver module, a driving order to a second vehicle located outside the spatial transmission area of the stationary transceiver module; and transmitting, by the second vehicle, data and/or status information to the central control unit via the first vehicle and the stationary transceiver module;

wherein the controllable light source of at least the stationary transceiver module includes a controllable light source of visible light and the light sensor of at least each vehicle includes a light sensor for visible light;

the method further comprising:

receiving, by the second vehicle, a first driving order and a second driving order executing, by the second vehicle, the first driving order;

storing, by the second vehicle, the second driving order;

establishing a communications link between the second vehicle and a further vehicle; and transmitting, by the second vehicle, to the further vehicle, the second driving order after establishing the communications link between the second vehicle and the further vehicle.

10. A method for operating and/or controlling a system that includes a plurality of vehicles, a central control unit, and at least one stationary transceiver module connected to the central control unit by a bidirectional communications channel, the transceiver module having a spatial transmission area and/or a transmission cone, each vehicle including a respective transceiver module and/or a respective spatial transmission area for bidirectional communication with the stationary transceiver module and/or another vehicle, the respective transceiver module having a controllable light source and a light sensor, comprising:

transmitting, by the central control unit, driving orders to the vehicles via the stationary transceiver module;

forwarding, by a first vehicle located in the spatial transmission area of the stationary transceiver module, a driving order to a second vehicle located outside the spatial transmission area of the stationary transceiver module; and transmitting, by the second vehicle, data and/or status information to the central control unit via the first vehicle and the stationary transceiver module;

wherein the controllable light source of at least the stationary transceiver module includes a controllable light source of visible light and the light sensor of at least each vehicle includes a light sensor for visible light;

the method further comprising:

receiving, by the second vehicle, a driving order from the first vehicle;

forwarding, by the second vehicle, to a further vehicle, the driving order received from the first vehicle; and storing, by the second vehicle, the driving order received from the first vehicle, wherein the driving order received from the first vehicle is forwarded by the second vehicle to the further vehicle with a time delay.

11. A system, comprising:

a plurality of vehicles; and at least one stationary transceiver module having a spatial transmission area and/or a transmission cone;

wherein each vehicle includes a first transceiver module, a second transceiver module, and a position-determination device and/or a distance sensor, each transceiver including a controllable light source and a light sensor; and wherein each vehicle is adapted to bidirectionally communicate with the stationary transceiver module using the first transceiver module and is adapted to birectionally communicate with other vehicles using the second transceiver module;

wherein the controllable light source of at least the stationary transceiver module includes a controllable light source of visible light and the light sensor of at least each vehicle includes a light sensor for visible light.

12. The system according to claim 11, wherein the position-determination device includes an odometric sensor and/or a GPS sensor.

13. The system according to claim 11, wherein the distance sensor includes a radar sensor and/or an ultrasonic sensor.

14. The system according to claim 11, wherein the controllable light source of each vehicle includes a controllable light source of visible light and/or the light sensor of the stationary transceiver module includes a light sensor for visible light.

15. The system according to claim 11, further comprising a central control unit adapted to control the vehicles, the central control unit connected to the stationary transceiver module by at least one bidirectional communications channel, the central control unit adapted to transmit driving orders to a respective vehicle via the stationary transceiver module.

16. The system according to claim 11, wherein each vehicle includes a memory adapted to store position data of the stationary transceiver module, identifying information of other vehicles, and/or position data of other vehicles.

17. The system according to claim 16, the memory unit is adapted to store driving orders of a further vehicle.

18. The system according to claim 11, wherein the stationary transceiver module is disposed above the vehicles and/or the first transceiver module is arranged on the vehicle in alignment with the stationary transceiver module.

19. The system according to claim 15, wherein the system includes a plurality of stationary transceiver modules set apart from one another;

the spatial transmission areas of the stationary transceiver modules being set apart from one another;

each stationary transceiver module being connected to the central control unit via at least one respective bidirectional communications channel.

20. A system, comprising:

a plurality of vehicles; and at least one stationary transceiver module having a spatial transmission area and/or a transmission cone;

wherein each vehicle includes a first transceiver module, a second transceiver module, and a position-determination device and/or a distance sensor, each transceiver including a controllable light source and a light sensor; and wherein each vehicle is adapted to bidirectionally communicate with the stationary transceiver module using the first transceiver module is adapted to birectionally communicate with other vehicles using the second transceiver module;

wherein the controllable light source of at least the stationary transceiver module includes a controllable light source of visible light and the light sensor of at least each vehicle includes a light sensor for visible light; and wherein each vehicle includes a third transceiver module adapted to communicate with the second and/or third transceiver module of other vehicles;

a spatial transmission area of the second transceiver module and a spatial transmission area of the third transceiver module jointly covering a larger spatial area than the spatial transmission area of the second or the third transceiver module;

the second transceiver module being aligned in a driving direction of the vehicle; and the third transceiver module being aligned counter to the driving direction of the vehicle.

21. A system, comprising:

a plurality of vehicles; and at least one stationary transceiver module having a spatial transmission area and/or a transmission cone;

wherein each vehicle includes a first transceiver module, a second transceiver module, and a position-determination device and/or a distance sensor, each transceiver including a controllable light source and a light sensor;

wherein the controllable light source of at least the stationary transceiver module includes a controllable light source of visible light and the light sensor of at least each vehicle includes a light sensor for visible light;

wherein each vehicle is adapted to bidirectionally communicate with the stationary transceiver module using the first transceiver module and is adapted to birectionally communicate with other vehicles using the second transceiver module;

wherein the central control unit is adapted to transmit driving orders to the vehicles via the stationary transceiver module;

wherein a first one of the vehicles, located in the spatial transmission area of the stationary transceiver module, is adapted to forward a driving order to a second one of the vehicles located outside the spatial transmission area of the stationary transceiver module; and wherein the second one of the vehicles is adapted to transmit data and/or status information to the central control unit via the first vehicle and the stationary transceiver module.

* * * * *